United States Patent
Yoo et al.

(10) Patent No.: US 6,183,690 B1
(45) Date of Patent: *Feb. 6, 2001

(54) METHOD OF BONDING A PARTICLE MATERIAL TO NEAR THEORETICAL DENSITY

(75) Inventors: Sang H. Yoo, Fairfax; Krupashankara M. Sethuram, Falls Church; Tirumalai S. Sudarshan, Vienna, all of VA (US)

(73) Assignee: Materials Modification, Inc., Fairfax, VA (US)

(*) Notice: Under 35 U.S.C. 154(b), the term of this patent shall be extended for 0 days.

This patent is subject to a terminal disclaimer.

(21) Appl. No.: 09/412,519

(22) Filed: Oct. 5, 1999

Related U.S. Application Data

(63) Continuation of application No. 09/223,964, filed on Dec. 31, 1998, now Pat. No. 6,001,304.

(51) Int. Cl.⁷ .................................................... B22F 3/12
(52) U.S. Cl. ............................. 419/52; 75/228; 264/603
(58) Field of Search ............................. 419/10, 51, 56, 419/52; 75/228; 264/603

(56) References Cited

U.S. PATENT DOCUMENTS

| | | |
|---|---|---|
| 3,250,892 | 5/1966 | Inoue . |
| 3,340,052 | 9/1967 | Inoue . |
| 3,598,566 | 8/1971 | Inoue . |
| 3,630,727 * | 12/1971 | Rossmann ............................. 75/214 |
| 3,670,137 | 6/1972 | Inoue . |
| 4,005,956 | 2/1977 | Inoue . |
| 4,435,359 * | 3/1984 | Eiselstein et al. ....................... 419/3 |
| 5,084,088 | 1/1992 | Okazaki . |
| 5,134,260 | 7/1992 | Piehler et al. . |
| 5,262,123 * | 11/1993 | Thomas et al. ......................... 419/67 |
| 5,427,660 | 6/1995 | Kamimura et al. . |
| 5,529,746 | 6/1996 | Knöss et al. . |
| 5,678,166 | 10/1997 | Piehler et al. . |
| 5,694,640 | 12/1997 | Greetham . |
| 5,704,555 | 1/1998 | Arastoopour . |
| 5,743,471 | 4/1998 | Ivanov . |
| 5,794,113 | 8/1998 | Munir et al. . |
| 6,001,304 * | 12/1999 | Yoo et al. ............................... 419/10 |

OTHER PUBLICATIONS

F.V. Lenel, "Resistance Sintering Under Pressure" Journal of Metals, vol. 7, No. 1, pp. 158–167 (1955).

M.J. Tracy et al, "Consolidation Of Nanocrystalline Nb–Al Powders By Plasma Activated Sintering" NanoStructured Materials, vol. 2, pp. 441–449 (1993).

U.S. application Ser. No. 09/274,878, filed Mar. 23, 1999, entitled "Apparatus for Bonding a Particle Material to Near Theoretical Density".

* cited by examiner

Primary Examiner—Daniel J. Jenkins
(74) Attorney, Agent, or Firm—Dinesh Agarwal, P.C.

(57) ABSTRACT

A method of bonding a particle material to near theoretical density, includes placing a particle material in a die. In the first stage, a pulsed current of about 1 to 20,000 amps., is applied to the particle material for a predetermined time period, and substantially simultaneously therewith, a shear force of about 5–50 MPa is applied. In the second stage, an axial pressure of about less than 1 to 2,000 MPa is applied to the particle material for a predetermined time period, and substantially simultaneously therewith, a steady current of about 1 to 20,000 amps. is applied. The method can be used to bond metallic, ceramic, intermetallic and composite materials to near-net shape, directly from precursors or elemental particle material without the need for synthesizing the material. The method may also be applied to perform combustion synthesis of a reactive material, followed by consolidation or joining to near-net shaped articles or parts. The method may further be applied to repair a damaged or worn substrate or part, coat a particle onto a substrate, and grow single crystals of a particle material.

20 Claims, 3 Drawing Sheets

METHOD OF BONDING A PARTICLE MATERIAL TO NEAR THEORETICAL DENSITY

This is a Continuation of application Ser. No. 09/223,964 filed Dec. 31, 1998 now U.S. Pat. No. 6,001,304.

FIELD AND HISTORICAL BACKGROUND OF THE INVENTION

The present invention is directed to bonding particle materials, and more particularly to reactive or nonreactive synthesis, consolidation, or joining of metallic, ceramic, intermetallic, or composite materials to near-net shapes by application of high shear, high current (1–20 kA), and high pressure (about 1 to 2,000 MPa).

Pressure-assisted consolidation or sintering generally involves heating a particle powder compact, while applying pressure simultaneously. The powder compacts are typically heated externally using graphite or molybdenum heating elements and the pressure is applied hydraulically, pneumatically or isostatically depending on the type of the process. Conventional pressure assisted consolidation techniques include hot pressing, hot isostatic pressing, hot forging, and hot extrusion. The conventional techniques require long processing time and high chamber temperature in order to produce high-density parts. In addition, several preparatory steps are required, such as powder heat treatment, precompaction, canning, welding, and machining.

The field of powder consolidation includes powder particles with average particle sizes ranging from about 100 microns to less than 0.01 microns. In any powder consolidation process, the objective is to have minimum grain boundary contamination, maximum density and minimum grain growth. However, powder particles with large surface area, due to their surface charge distribution, readily react with the atmosphere and form a stable oxide phase, which significantly affects the consolidation process. The presence of these oxides, moisture and other contaminants on the surface of the particles, limits the final density that can be achieved and degrades the mechanical properties of the consolidated parts. Thus, it is important to reduce the surface impurities, such as oxygen and other contaminants present on the particle surfaces.

The consolidation of powders to near theoretical density, without significant grain growth has been a difficult task because of the tendency for the grains to coarsen at elevated temperature. Attempts have been made to consolidate powders with average particle size less than 0.01 microns by many techniques, such as furnace sintering, hot pressing, and hot isostatic pressing. However, the drawback is that the total time required for consolidation at the elevated temperature, is very long (several hours) which leads to significant grain growth, and poor mechanical and thermal properties.

Most refractory metals, ceramics, intermetallics and certain composite materials, are extremely hard and require diamond-tipped tools to machine them to final dimensions. In order to minimize expensive machining, the powder densification process must be capable of near-net shaping. The development of a novel process that consolidates the difficult-to-sinter materials into near-net shaped parts has been the goal of many powder metallurgy industries.

As application opportunities continue to emerge that require materials to perform at higher temperatures for sustained periods of time, joining of ceramic and intermetallic materials becomes necessary to enable advanced structure to be produced. Sinter bonding, sinter-HIP bonding, diffusion bonding are typically employed to join these advanced materials. However, long preparation and processing times are required in the conventional techniques that result in high manufacturing cost.

Ultrafine particle materials (with average particle size less than 0.01 micron) have great potential in structural, electronic, thermal management and optical applications since these materials exhibit superior performance characteristics.

Various techniques relating to compacting or sintering of powder materials are disclosed in U.S. Pat. Nos. 3,250,892; 3,340,052; 3,598,566; 3,670,137; 4,005,956; 5,084,088; 5,427,660; and 5,529,746; and in publications—F. V. Lenel, "Resistance Sintering Under Pressure", Journal of Metal, Vol. 7, No. 1, pp 158–167 (1955), and M. J. Tracey et al., "Consolidation of Nanocrystalline Nb—Al Powders by Plasma Activated Sintering", NanoStructured Materials, Vol. 2, pp. 441–449 (1993).

The prior art techniques are also not considered effective at least for the reasons that they: are limited to producing smaller size parts, result in nonuniform distribution of temperature throughout the powder compact, result in lower than near theoretical densities, result in undesirable grain growth, do not reactively consolidate or join the materials, do not consolidate or join precursor particle materials, require pretreatment or presynthesis of the particle material, do not apply to ultrafine particles (<1 micron), etc.

In view of the above, there is a need in the industry for a technique that can rapidly consolidate, bond or join precursor or elemental particle material to near theoretical density without requiring complicated preparatory steps.

OBJECTS AND SUMMARY OF THE INVENTION

The principal object of the present invention is to provide a method of rapidly bonding a particle material to near theoretical density with minimum grain growth and to join or bond with high interface integrity and minimum microstructural distortion in the bulk material.

An object of the present invention is to provide a method of bonding a particle material to near theoretical density and near net shape using pulsed plasma, pressure and current.

Another object of the present invention is to provide a method in which a particle material can be reactively or nonreactively consolidated or joined to near-net shape and near theoretical density in a short period of time (less than 10 minutes) with minimum grain growth.

Yet another object of the present invention is to provide a method of bonding a particle material to near theoretical density in which oxygen and other contaminants are removed during the bonding step without any additional preparatory steps.

Still yet another object of the present invention is to provide a method of bonding particle material to near theoretical density which produces bonded material or desired articles economically at reduced processing temperature and time while maintaining nanometer dimensions.

An additional object of the present invention is to provide a method of bonding a particle material to near theoretical density which produces dense near-net shape parts or articles without expensive machining.

Yet an additional object of the present invention is to provide a rapid bonding technique that can join ceramic, intermetallic, and other dissimilar materials in a short period of time without any complicated preparation.

Still yet an additional object of the present invention is to provide a method of bonding a particle material to near theoretical density which can produce near-net shape parts or articles directly from precursors or elemental particle material without the complicated synthesis steps.

Another object of the present invention is to provide a method of bonding a particle material to near theoretical density by simultaneously applying high shear or high pressure, and high current directly to the particle material resulting in: high heating rate (less than 100° C.–1,500° C. per minute), improved particle surface activation, enhanced densification, uniform distribution of heat, and strong bonding.

Yet another object of the present invention is to provide a method of bonding a particle material to near theoretical density which can be used to bond powders with average particle size ranging from 100 microns to 0.01 microns, without significant grain growth, by rapidly processing at lower temperature and duration.

Still yet another object of the present invention is to provide a method of bonding a particle material to near theoretical density which does not require the use of any binders or additives for producing desired shapes.

An additional object of the present invention is to provide a method of bonding a particle material to near theoretical density which produces near-net shape, high density ceramic or other material parts by using a combination of "sol-gel" precursor and a reactive gas in the presence of pulsed and steady electric field.

Yet an additional object of the present invention is to provide a method of bonding a particle material, such as $B_4C/SiC$, Ti $B_2/BN$, and $Al_2O_3/AlN$.

An additional object of the present invention is to provide a method of rapidly bonding diamond and coated diamond powders into near-net shaped parts or articles.

Yet an additional object of the present invention is to provide a method of bonding a particle material to near theoretical density which can produce near-net shape parts of any desired geometry, such as cylindrical, cubic, rectangular, hemispherical, tubular, or any combination thereof.

Still yet additional object of the present invention is to provide a method of bonding a particle material to near theoretical density by creating interparticle plasma which controls the undesirable grain growth, reduces the densification temperatures, and significantly improves the properties of the bonded material.

A further object of the present invention is to provide a method of producing an article having a near-net shape and near theoretical density and a length of less than one-half inch to six inches or more, or a diameter of less than one-half inch to six inches or more.

Yet a further object of the present invention is to provide a method of producing near-net shaped articles having improved properties, rapidly and at significantly lower manufacturing costs.

Still yet a further object of the present invention is to provide a method of bonding a particle material by producing interparticle plasma that controls particle grain growth, reduces densification temperatures and improves the overall properties of the bonded material.

An additional object of the present invention is to provide a method of bonding a particle material which can be used to restore or repair damaged parts or articles.

Yet an additional object of the present invention is to provide a method of bonding a particle material which can be used to coat or clad a particle material to a surface.

Still yet an additional object of the present invention is to provide a method of bonding a particle material which can be used to grow single crystals of a particle material.

In summary, the invention relates to reactive and non-reactive synthesis, consolidation, sintering, joining, or bonding process of particle material into near-net shape and near theoretical density using high shear, high pressure (less than 1–2,000 MPa) and high current (1–20 kA).

In the process of the invention, the materials to be consolidated or joined, are placed preferably in a graphite die and punch assembly. The driving force for densification and joining is provided by passing current directly through the particle material, while simultaneously applying high shear and high pressure in separate steps. High shear force in combination with pulsed electric power is initially applied to the particle material to generate electrical discharge that activates the particle surface by evaporation of oxide film, impurities, and moisture. Subsequently, bonding is accomplished by resistance heating at the contact points between the activated particles in the presence of high pressure. The time and temperature required for consolidation or joining is lowered as high current density is applied in addition to high shear and high pressure (up to 2,000 MPa), which leads to localized heating and plastic deformation at interparticle contact areas. The rapid sintering, which preferably lasts for less than ten minutes, prevents grain growth and allows the particles to retain their initial microstructure.

The unique feature of the present process is the simultaneous application of pulsed current and high shear on the particle material resulting in surface heating of the particles to very high temperatures for short periods of time resulting in a localized plasma which enhances the rupturing of the surface oxide layers and facilitates rapid diffusion at the surface of the particles. The temperature of the particle material remains low, thereby minimizing the grain growth and the processing temperature. Application of the shear forces during surface heating of the particles results in an abrasive action between the particles to further facilitate rupturing of the surface oxide layer and redistribution of the particles. High shear causes deformation of the powder particles, deagglomeration of the particles and since they are in intimate contact it reduces the consolidation temperature. Reduced consolidation temperature results in reduced grain growth and improved performance.

It is noted herewith that, as used herein, the term "bonding" includes, but is not limited to, reactive or nonreactive joining of generally solid materials, and reactive or nonreactive consolidation, sintering or synthesis of particles or powder materials. Likewise, the term "particle material", includes, but is not limited to, particle material in any form, such as solid, liquid, powder, gas, fluid, etc. Preferably, the particle material includes metallic, ceramic, intermetallic, alloy, composite, coated or uncoated powders, porous materials, partially dense, and fully dense substrates.

BRIEF DESCRIPTION OF THE DRAWINGS

The above and other objects, novel features and advantages of the present invention will become apparent from the accompanying detailed description of the invention as illustrated in the drawings, in which.

DETAILED DESCRIPTION OF THE INVENTION

Figure 1:
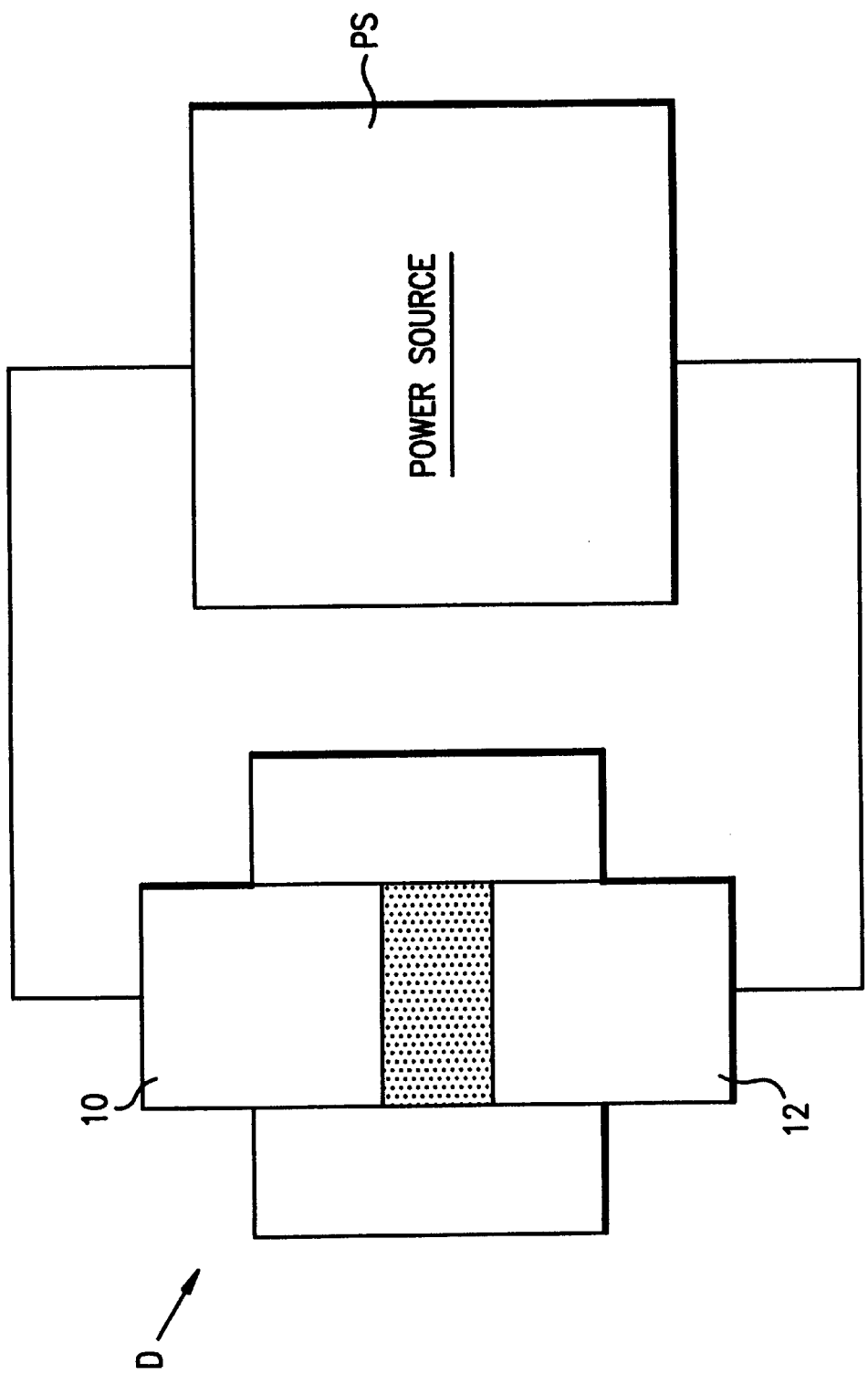
FIG. 1 is a schematic representation of an apparatus that is utilized in carrying out the method of the present invention.
Figure 2:
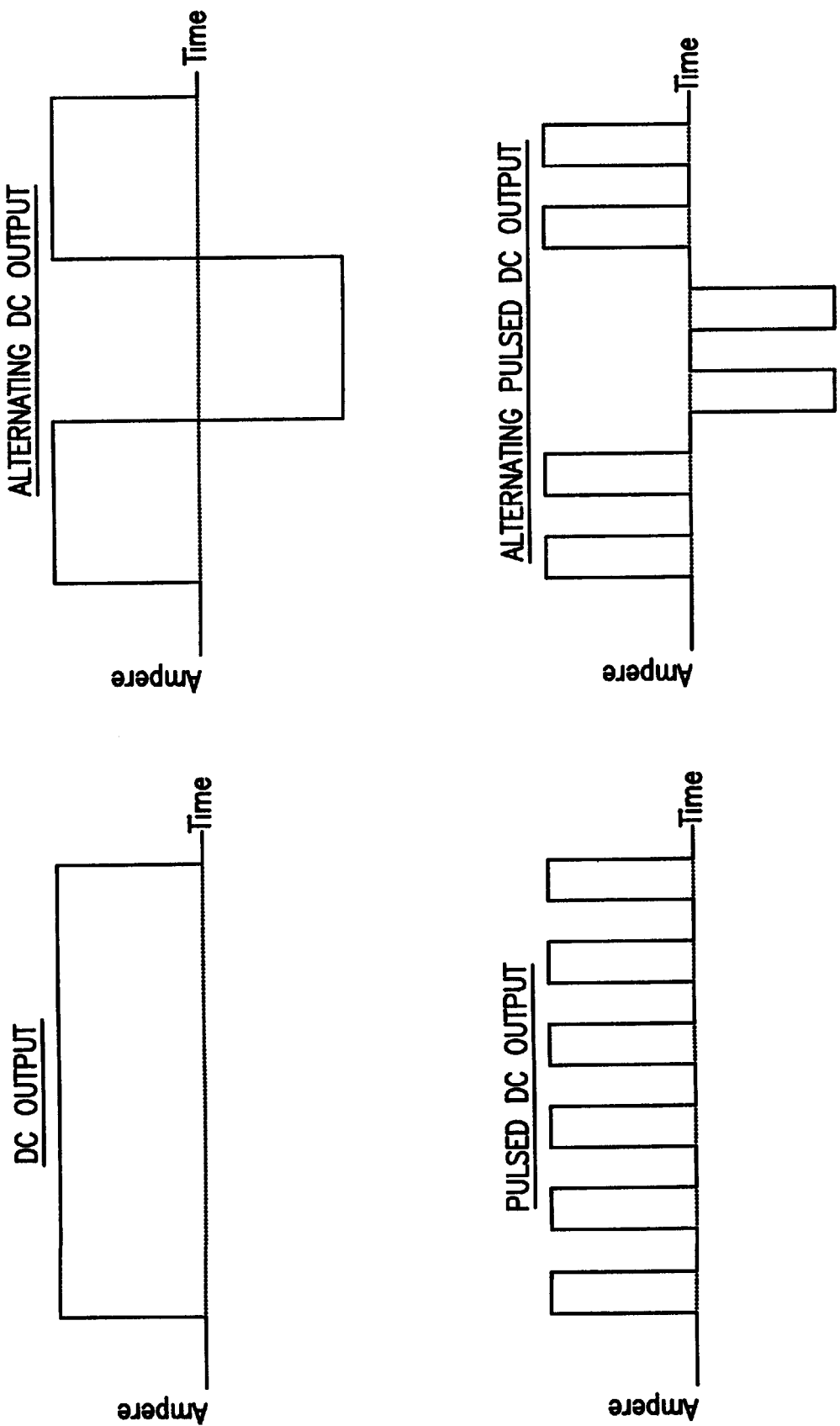
FIG. 2 is a schematic representation of the pulsed, alternating pulsed, alternating DC and steady DC current flow pattern of the output from the power supply.
Figure 3:
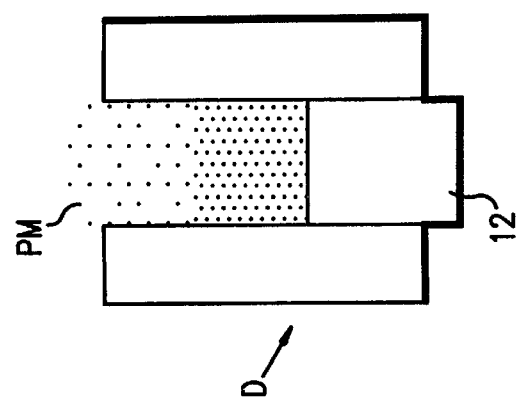

As best shown in FIGS. 1 and 3, the particle material PM, to be consolidated or joined, is placed in a chamber, such as a punch and die assembly D, preferably a graphite or carbon—carbon composite die assembly, and the plungers 10 and 12 are inserted on both sides.

The particle material is preferably a coated or uncoated particle powder, or a solid substrate. The assembly D is then placed in a chamber C with controlled atmosphere and pressure. In particular, a vacuum is preferably created in chamber C via conduits 14 and 16. The treatment of the particle material PM in the vacuum causes improved removal of oxide, moisture and other contaminants from the particle or solid substrate surface, and results in a product with improved and better properties, such as substantially enhanced purity. The conduits 14 and 16 also permit injection of reactive gases, such as nitrogen, ammonia, methane, oxygen, hydrogen, etc., for 'in situ' reactive consolidation or joining of various materials. Inert gases, such as helium, argon, etc., may also be injected into the chamber C.

A hydraulic piston (not shown) is lowered on the top graphite plunger 10 to hold the entire assembly together and to provide a path for the current to flow. Once sufficient particle contacts have been established, pulsed current is applied using a power supply PS. The voltage varies from about 1V–100V and the current from about 1–20 kA. Preferably, the voltage varies from about 1–30V and the current from about 1–8,000 amps. The voltage depends on the electrical resistively of the die, plunger, and the materials to be consolidated or joined, and the current depends largely on the size of the powder compact. The pulsing rate can vary from about 1 to 1000 Hz, and preferably from about 10–100 Hz, and the pulsing duration from about less than 1–600 minutes, and preferably from about 5–30 minutes.

Figure 4:
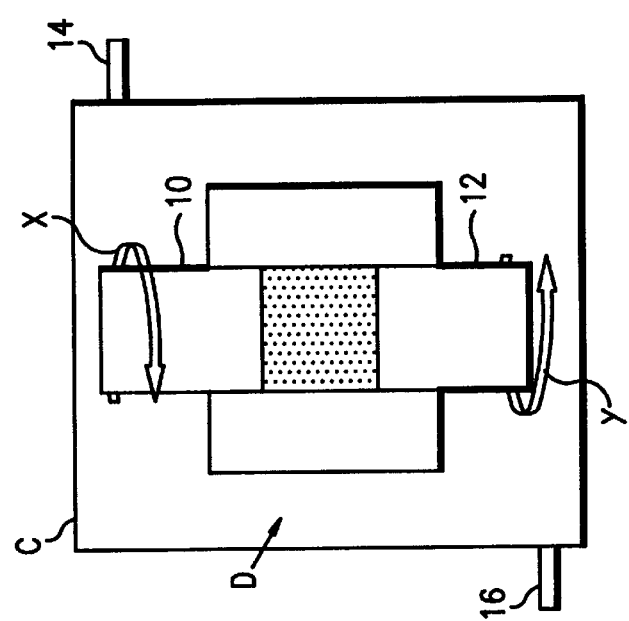

As pulsed current is applied, the top graphite plunger 10 is rotated in a clockwise direction (see arrow X in FIG. 4) and the bottom plunger 12 is rotated in a counterclockwise direction (see arrow Y in FIG. 4), to generate high shear between the particles. The rotation of the plungers is preferably controlled from 1 to 10 revolutions per minute, and the pressure from about less than 1–2,000 MPa, and preferably from about 10–200 MPa. The surface activation of the particles results in the outgassing of volatile species via conduits 14 and 16.

Figure 5:
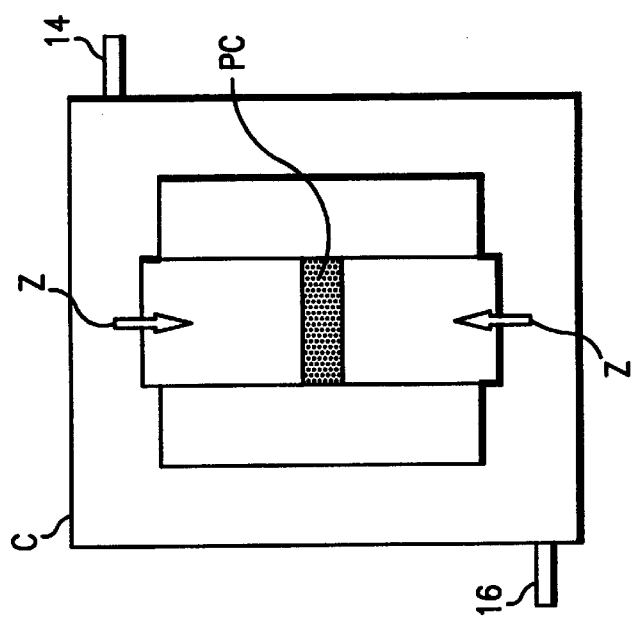
FIGS. 3–5 are schematic illustrations of the steps in carrying out the method of the present invention.

Subsequently, as shown in FIG. 5, a steady DC current in combination with axial pressure (see arrows Z in FIG. 5) is applied to achieve rapid consolidation or joining of the particle material to form particle compact PC. The direct current value varies from about 1–20 kA, and preferably 1–8 kA, depending on the material and the size. The duration of direct DC current varies from about 5 to 60 minutes. The temperature attained during resistance heating varies from about less than 500° C. to over 2500° C., and is controlled by the amount of current flowing through the sample. A DC voltage may be applied in an alternating manner to provide uniform heating of the sample from top to bottom. Pressures of up to 2,000 MPa may be applied using the hydraulic cylinder and piston. The shape of the die and punches determines the shape of the part. For example, it can be cylindrical, cubic, rectangular, hemispherical, tubular or any combination of standard geometrical objects.

It is noted herewith that the shear and axial pressures may be applied by using one or combination of hydraulic means, pneumatic means, electric field and magnetic field.

Since the shape of the dies and punches determine the final shape of the consolidated or joined part, dies and punches are designed according to the required specifications for rapid near-net shape fabrication. The technique of the invention has been used to reactively consolidate metallic particle material, such as iron, cobalt, nickel, tungsten, rhenium; ceramics, such as silicon carbide, aluminum nitride, titanium dioxide, titanium diboride and aluminum dioxide; intermetallics, such as iron aluminides and molybdenum disilicide; and composite particle material, such as tungsten carbide cobalt, tungsten-copper, molybdenum-copper, and iron cobalt-silicon carbide.

The process has also been used to reactively join ceramics, such as silicon carbide/silicon carbide (SiC/SiC) and silicon carbide/alumina (SiC/$Al_2O_3$); intermetallics, such as molybdenum-disilicide ($MoSi_2$/$MoSi_2$) and iron aluminide/iron (FeAl/Fe); and dissimilar metals, such as iron/nickel (Fe/Ni), copper/boron nitride (Cu/BN), and tungsten/molybdenum (W/Mo). The technique of the invention provides a rapid near-net shape process that is capable of reactively or nonreactively consolidating or joining various particle materials to near theoretical density with minimum grain growth.

The method of the invention may be applied to produce near-net, high density samples or articles having a length of from about less than one-half to six inches or more, and a diameter of from about less than one-half to six inches or more.

The following Table 1 summarizes various parameters for carrying out the method of the invention.

TABLE 1

| Parameter | Operating Range | Preferred Range |
|---|---|---|
| Temperature | Room temperature to 3000° C. (25° C.) | Room temperature to 2500° C. (25° C.) |
| Pressure | <1 MPa to 2000 Mpa | 10 to 200 MPa |
| Cycle Time | <1 minute to 600 minutes | 5 to 30 minutes |
| Pulsing Frequency | 1 to 1000 Hz | 10–100 Hz |
| Peak Current | 5 A to 20 kA | 200 A to 20 kA |
| Base Line | 0 to 14000 A | 0–4000 A |
| Current | 1 to 20 kA | 1 to 8 kA |
| Heating Rate | 1–1500° C./minute | 100–1500° C./minute |
| Voltage | 1–100 V | 1–30 V |

The technique of the invention may also be applied to repair metallic, ceramic, intermetallic, alloy, single crystal and composite parts by localized surface modification. In service, most blade tips used in turbines and compressors, cutting tool edges get damaged. It will be more economical if the damaged part can be repaired and restored to the original dimension. The part to be repaired is cleaned, depending on the size or area of damage, powder particles or surface can be used. The part to be repaired and the particle material are placed in a chamber and pulsed electric current with shear, followed by steady current and high pressure are applied, as noted above. Bonding is ensured by localized diffusion of heat.

The technique of the invention may also be applied to clad powders on to metallic, ceramic, intermetallic, alloy, single crystal and composite parts. Ceramic materials in general have high wear resistance and low thermal conductivity. Certain applications, such as high temperature engines, turbines, will have an increase in efficiency by coating these parts with, for example, ceramic materials. Currently, there are only two methods of accomplishing this coating, plasma spray technique and physical and chemical vapor deposition (PVD/CVD) technique. In plasma spray, the coating is porous and the adhesion is poor. In the PVD/CVD technique, not all materials can be deposited and the coating develops a particular orientation. In accordance with the present invention, the part to be coated with a particular or a combination of particle materials is dip coated in a slurry and placed inside a vacuum chamber between the two plungers. The part is then heated using the pulsing and steady current technique of the present invention. This results in interparticle diffusion and bonding of particle material to the substrate. Thus, cladding the surface with the desired material. The thickness and density of the coating can be controlled by controlling the slurry concentration and the number of coating cycles.

Finally, the technique of this invention may be used to grow single crystals by using a combination of particle material and seed crystal. As one of ordinary skill in the art would be aware, applications of single crystals are steadily increasing and new techniques are being developed to produce single crystals. The present techniques of growing single crystals from vapor deposition or from molten metals are expensive and very sensitive to contamination and process parameters. Single crystals exhibits certain properties which cannot be attained by any other densification or processing techniques of the same material. Using the process of the invention, ultrafine powders can be packed along with a seed single crystal and placed preferably in a graphite die. Using a combination of pulsed power and steady current, as noted above, it is possible to grow single crystals.

The following Examples are provided to illustrate the invention, but it is understood that the invention is not limited thereto.

EXAMPLE 1

Rhenium powders (average particle size 25 microns) were consolidated to near theoretical density (96–99%) without significant grain growth by processing at 1100–1400° C. and 400–600 MPa with isothermal holding time of 1–10 minutes. The sample size ranged from ½ to 2" in length and ½ to 1" in diameter.

EXAMPLE 2

Tungsten powders (average particle size 0.2 to 4 microns) were consolidated to near theoretical density (96–99%) without significant grain growth by processing at 1100–1600° C. and at 10–900 MPa for 1–10 minutes. The sample size ranged from ½ to 2" in length and ½ to 1" in diameter.

EXAMPLE 3

Ultrafine iron powders (average particle size <0.1 microns) were consolidated to near theoretical density (96–99%) without significant grain growth by processing at 500–950° C. and 50–900 MPa for 1–5 minutes. The sample size ranged from ½ to 2" in length and ½ to 1" in diameter.

EXAMPLE 4

Molybdenum-Copper composite powders (average particle size 1–3 micron) were consolidated to near theoretical density (95–97%) at 900–1150° C. and at 50–900 MPa in less than 20 minutes. The sample size ranged from ½ to 2" in length and ½ to 1" in diameter.

EXAMPLE 5

Tungsten-carbide cobalt powders (with average particle size <1.0 micron to up to 12 microns) were consolidated to near theoretical density (96–99%) at 1300° C. and at 700 MPa in less than 5 minutes. The sample size ranged from ½ to 2" in length and ½ to 1" in diameter.

EXAMPLE 6

Aluminum nitride powders (<20 microns) were consolidated to near theoretical density (91–99%) without significant grain growth by processing at 1500–1600° C. and at 30–70 MPa for 1–5 minutes. The sample size ranged from ½ to 2" in length and ½ to 1" in diameter.

EXAMPLE 7

Aluminum powders (<30 microns) were consolidated to near theoretical density (96–99%) without significant grain growth by processing at 500–600° C. and at 30–70 MPa for 1–5 minutes. The sample size ranged from ½ to 2" in length and ½ to 1" in diameter. Hollow tubes were also consolidated with an internal diameter of ¼" and an outer diameter of 1 inch. The length of the tube was 1 inch.

EXAMPLE 8

Molybdenum disilicide powders (<10 microns) were consolidated to near theoretical density (92–96%) without significant grain growth by processing at 1700–1900° C. and at 30–70 MPa for 1–5 minutes. The sample size ranged from ½ to 2" in length and ½ to 1" in diameter.

EXAMPLE 9

Sol-gel precursor consisting of organometallic polymer of Si—C—O—H was decomposed to SiC by applying pulsed DC for 15 minutes at 200 amps followed by final consolidation to near theoretical density (95–96%) at 2100° C. and at 70 MPa for 30 minutes. The sample size was ½–1" in length and 1" in diameter.

EXAMPLE 10

Tantalum powders (<45 microns) were consolidated to near theoretical density (92–98%) without significant grain growth by processing at 1400–1600° C. and at 30–70 MPa for 1–8 minutes. The sample size ranged from ½ to 2" in length and ½ to 1" in diameter. Hollow tubes were also consolidated with an internal diameter of ¼" and an outer diameter of 1 inch. The length of the tube was 1 inch.

EXAMPLE 11

Joining of $SiC/Al_2O_3$ was achieved directly from SiC and $Al_2O_3$ powders by placing 0.5" long $Al_2O_3$ green compact on top of 0.5" long SiC green compact, and consolidating them at 2000° C. and 65 MPa for 20 minutes. Dense (98% of theoretical) and strongly bonded compact was produced without the use of additives and binders.

EXAMPLE 12

Titanium and boron powders were mixed in the ratio of 1:2 and combustion synthesized to form TiB and $TiB_2$ by applying pulsed DC current for <5 minutes at 2000 amps.

The powders were then consolidated to hollow cylinders (¼ inch inner diameter, 1 inch outer diameter and 1 inch long) at 2000° C. and 50 MPa for 10 minutes. The density of the final consolidated part was 95% of the theoretical density.

EXAMPLE 13

Diamond powders were consolidated at 800–1300° C. and under a pressure of 30–70 MPa with a hold time less than 5 minutes. The sample size ranged from ½ to 1" in length and ½ to 1" in diameter. Coated diamond powders such as cobalt coated diamond and nickel coated diamond powders were also consolidated under similar conditions.

EXAMPLE 14

Nickel aluminide powders were consolidated at 1000–1300° C. and under a pressure of 30–70 MPa for 1–5 minutes. The sample size ranged from ½ to 2" in length and ½ to 2" in diameter.

While this invention has been described as having preferred ranges, steps, materials, or designs, it is understood that it is capable of further modifications, uses and/or adaptations of the invention following in general the principle of the invention and including such departures from the present disclosure as those come within the known or customary practice in the art to which the invention pertains and as may be applied to the central features hereinbefore set forth, and fall within the scope of the invention and of the limits of the appended claims.

What is claimed is:

1. A method of bonding a particle material to near theoretical density, comprising the steps of:
   a) applying a shear force to a particle material for a time period; and
   b) substantially simultaneously with step a), applying a current to the particle material for a time period for bonding the particle material.
2. The method of claim 1, further comprising the step of:
   c) applying a pressure to the particle material obtained in step b).
3. The method of claim 2, further comprising the step of:
   d) applying a current to the particle material obtained in step c).
4. The method of claim 1, wherein:
   the step b) comprises applying a pulsed current to the particle material.
5. The method of claim 1, wherein:
   the step b) comprises applying a pulsed current of about 1–20,000 amps.
6. The method of claim 1, wherein:
   the step a) comprises applying a shear force of about 5–100 MPa.
7. The method of claim 1, wherein:
   the step a) comprises applying a shear force for a duration of about less than 1–15 minutes.
8. The method of claim 1, wherein:
   the step a) application of shear force comprises applying a pressure using hydraulic means, pneumatic means, ultrasonic means, an electric field, a magnetic field, or a combination thereof.
9. The method of claim 1, wherein:
   the step b) comprises applying a pulsed current to the particle material substantially simultaneously with the step a) application of shear force.
10. The method of claim 4, wherein:
    the step b) comprises applying a current having a pulsing frequency of about 1–1,000 Hz.
11. The method of claim 9, wherein:
    the pulsing duration in step b) is about less than 1–600 minutes.
12. The method of claim 3, wherein:
    the step d) comprises applying a current of about 1–100,000 amps.
13. The method of claim 3, wherein:
    the step d) comprises applying a current for a duration of about 5–60 minutes.
14. The method of claim 3, wherein:
    the step d) comprises applying a steady current to the particle material substantially simultaneously with the step c) application of pressure.
15. The method of claim 2, wherein:
    the step c) comprises applying an axial pressure of about 1–2,000 MPa.
16. The method of claim 1, wherein:
    the particle material comprises a precursor or elemental particle material selected from the group consisting of metallic material, ceramic material, polymeric material, intermetallic material, alloy, composite material, coated powder, uncoated powder, porous material, partially dense substrate, and fully dense substrate.
17. The method of claim 1, wherein:
    the particle material comprises diamond or coated diamond powder.
18. The method of claim 1, wherein:
    the particle material comprises powder particles having an average particle size of about 100 microns to less than 0.01 microns.
19. The method of claim 1, wherein:
    the bonded particle material comprises a density of about 90% or higher.
20. A bonded material made in accordance with the method of claim 1.

* * * * *